US012361506B2

(12) United States Patent
Shao et al.

(10) Patent No.: US 12,361,506 B2
(45) Date of Patent: Jul. 15, 2025

(54) INTERNET OF THINGS (IoT) SYSTEMS AND METHODS FOR INTELLIGENT GAS EMERGENCY SAFETY MANAGEMENT

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Junyan Zhou, Chengdu (CN); Yuefei Wu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/920,857

(22) Filed: Oct. 19, 2024

(65) Prior Publication Data

US 2025/0045856 A1 Feb. 6, 2025

(30) Foreign Application Priority Data

Sep. 25, 2024 (CN) ......................... 202411341526.6

(51) Int. Cl.
*G06Q 50/06* (2024.01)
*G06Q 10/10* (2023.01)
(Continued)

(52) U.S. Cl.
CPC ........... *G06Q 50/265* (2013.01); *G06Q 50/06* (2013.01)

(58) Field of Classification Search
CPC .. G06Q 50/265; G06Q 50/06; G06Q 10/0637; G06F 16/252; G06F 18/22
(Continued)

(56) References Cited

U.S. PATENT DOCUMENTS

2019/0174208 A1* 6/2019 Speicher ................. G06F 1/163
2019/0362523 A1* 11/2019 Ngoi ..................... G06T 11/001
(Continued)

FOREIGN PATENT DOCUMENTS

CN 104850052 B 8/2017
CN 110059910 A 7/2019
(Continued)

OTHER PUBLICATIONS

Notification to Grant Patent Right for Invention in Chinese Application No. 202411341526.6 mailed on Nov. 28, 2024, 9 pages.
(Continued)

*Primary Examiner* — Jonathan P Ouellette
(74) *Attorney, Agent, or Firm* — METIS IP LLC

(57) ABSTRACT

Provided are an IoT system and a method for intelligent gas emergency safety management. The IoT system comprises a government safety supervision service platform, a government safety supervision management platform, a government safety supervision sensor network platform, a government safety supervision object platform, and a gas equipment object platform, wherein the government safety supervision object platform includes a gas company management platform. The method includes: obtaining emergency event information; determining an initial emergency response plan by matching in an emergency response plan database; obtaining traffic information and environmental information within an emergency scope; obtaining gas supply and demand data, available personnel information, and available resources information; determining a target emergency response plan by updating the initial emergency response plan; and sending the target emergency response plan to the gas company management platform for execution and obtaining an execution result of the gas company management platform.

7 Claims, 5 Drawing Sheets

(51) Int. Cl.
*G06Q 40/08* (2012.01)
*G06Q 50/26* (2012.01)

(58) Field of Classification Search
USPC .......................................... 705/1.1–912, 325
See application file for complete search history.

(56) References Cited

U.S. PATENT DOCUMENTS

| | | | | |
|---|---|---|---|---|
| 2020/0193699 | A1* | 6/2020 | Buhulaiga | G06Q 50/26 |
| 2020/0274962 | A1* | 8/2020 | Martin | H04W 4/02 |
| 2023/0066525 | A1* | 3/2023 | Cabanas | H04W 4/029 |
| 2023/0073685 | A1 | 3/2023 | Shao et al. | |
| 2023/0228364 | A1 | 7/2023 | Shao et al. | |
| 2024/0110674 | A1 | 4/2024 | Shao et al. | |

FOREIGN PATENT DOCUMENTS

| | | | |
|---|---|---|---|
| CN | 108167655 | B | 6/2020 |
| CN | 111415064 | A | 7/2020 |
| CN | 112308733 | B | 9/2021 |
| CN | 115356978 | A | 11/2022 |
| CN | 115204752 | B | 12/2022 |
| CN | 116308125 | A | 6/2023 |
| CN | 116386287 | A | 7/2023 |
| CN | 116951317 | A | 10/2023 |
| CN | 118012848 | A | 5/2024 |
| CN | 118228996 | A | 6/2024 |
| CN | 118535929 | A | 8/2024 |
| CN | 118536759 | A | 8/2024 |
| CN | 118690943 | A | 9/2024 |
| WO | 9422693 | A1 | 10/1994 |
| WO | 2017136489 | A1 | 8/2017 |

OTHER PUBLICATIONS

First Office Action in Chinese Application No. 202411341526.6 mailed on Nov. 12, 2024, 19 pages.

Xu, Xiyuan et al., Research on electric power emergency command information system, Design and construction, Raikkonen spinning & spinning Co., Ltd., 2022, 7 pages.

Ma, Jinshan et al., Grey Target Decision Method for Positive and Negative Target Centers Based on Decision Maker's Preferences, Science and Technology Management Research, 185-190, 2014, Abstract Only.

Lan, Haijian et al., Research and Application of Emergency Decision-making Support System for High Temperature Gas-Cooled Reactor, Automation Panorama, 89-93, 2019, Title Only.

Zheng, Jing et al., Group Emergency Alternative Adaptation Method Oriented Characteristic of Multi-department and Multi-attribute, Operations Research and Management Science, 29(2): 66-72, 2020, Abstract Only.

Zheng, Jing et al., Emergency Alternative Adaptation Method based on Belief Rule-base, Information and Control, 45(5): 634-640, 2016, Abstract Only.

Ren, Yongchang et al., Pipe Burst Detection and Valve-turnof Algorithm on Water Supply Pipe Network Based on GIS, Computer Technology and Development, 22(6): 258-261, 2012, Abstract Only.

* cited by examiner

INTERNET OF THINGS (IoT) SYSTEMS AND METHODS FOR INTELLIGENT GAS EMERGENCY SAFETY MANAGEMENT

CROSS-REFERENCE TO RELATED APPLICATIONS

This application claims priority to Chinese Patent Application No. 202411341526.6, filed on Sep. 25, 2024, the entire contents of which are incorporated herein by reference.

TECHNICAL FIELD

The present disclosure relates to the field of gas emergency management, and in particular to Internet of Things (IoT) systems and methods for intelligent gas emergency safety management.

BACKGROUND

Gas emergency response generally utilizes a pre-established emergency response plan to quickly react to a gas incident (e.g., a gas leak, a fire caused by gas, an unexpected shutdown, insufficient gas supply due to a gas equipment failure, etc.), thus preventing the escalation of the gas incident by following the emergency response plan.

Most of the prior art generates a corresponding emergency response plan by matching key information of a gas incident with key information of historical abnormal events. However, due to differences in the time, location, and type of gas incidents, a single emergency response plan may result in improper handling of gas incidents, leading to greater losses, additional resource waste, and an inability to meet the needs for addressing gas emergencies.

For example, CN112308733B proposes a system and a method for urban intelligent management in which the system automatically generates an emergency response plan and issues the emergency response plan to a rescue unit for emergency work. However, this technical solution lacks real-time data monitoring of different incidents, reducing the accuracy of matching the emergency response plan with the actual situation at an incident site.

Therefore, it is desirable to provide an IoT system and a method for intelligent gas emergency safety management to improve the efficiency and quality of gas emergency responses.

SUMMARY

One or more embodiments of the present disclosure provide a method for intelligent gas emergency safety management, the method being realized by an IoT system for intelligent gas emergency safety management. The IoT system comprises a government safety supervision service platform, a government safety supervision management platform, a government safety supervision sensor network platform, a government safety supervision object platform, and a gas equipment object platform, wherein the government safety supervision object platform includes a gas company management platform. The method is implemented by the government safety supervision management platform, and the method comprises: obtaining, based on the gas company management platform, emergency event information from the gas equipment object platform; determining an initial emergency response plan by matching in an emergency response plan database based on the emergency event information; obtaining traffic information and environmental information within an emergency scope from the government safety supervision service platform; obtaining gas supply and demand data, available personnel information, and available resources information from the gas company management platform; determining a target emergency response plan by updating the initial emergency response plan based on the traffic information, the environmental information, the gas supply and demand data, the available personnel information, and the available resources information; and sending the target emergency response plan to the gas company management platform for execution through the government safety supervision sensor network platform, and obtaining an execution result of the gas company management platform.

One or more embodiments of the present disclosure provide an Internet of Things (IoT) system for intelligent gas emergency safety management. The IoT system comprises a government safety supervision service platform, a government safety supervision management platform, a government safety supervision sensor network platform, a government safety supervision object platform, and a gas equipment object platform. The government safety supervision object platform includes a gas company management platform, which is configured to: obtain, based on the gas company management platform, emergency event information from the gas equipment object platform; determine an initial emergency response plan by matching in an emergency response plan database based on the emergency event information; obtain traffic information and environmental information within an emergency scope from the government safety supervision service platform; obtain gas supply and demand data, available personnel information, and available resources information from the gas company management platform; determine a target emergency response plan by updating the initial emergency response plan based on the traffic information, the environmental information, the gas supply and demand data, the available personnel information, and the available resources information; and send the target emergency response plan to the gas company management platform for execution through the government safety supervision sensor network platform, and obtain an execution result of the gas company management platform.

One or more embodiments of the present disclosure provide a non-transitory computer-readable storage medium, wherein the storage medium stores computer instructions, and when a computer reads the computer instructions, the computer executes the method for intelligent gas emergency safety management described in the present disclosure.

Beneficial effects that may be brought about by the IoT system and the method for intelligent gas emergency safety management disclosed in some embodiments of the present disclosure include, but are not limited to: (1) by determining the target emergency response plan based on the traffic information, the environmental information, the available personnel information, the gas supply and demand data, and the available resources information, emergency response resources can be reasonably allocated, thereby addressing gas emergency events in a timely manner and reducing unnecessary losses; (2) by obtaining the emergency feedback information after the occurrence of a gas emergency event, and updating the target emergency response plan based on the emergency feedback information, the emergency scope, and other data, real-time and effectiveness of all data can be ensured, thereby avoiding the waste of emergency response resources and ensuring the safety of gas usage for users.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
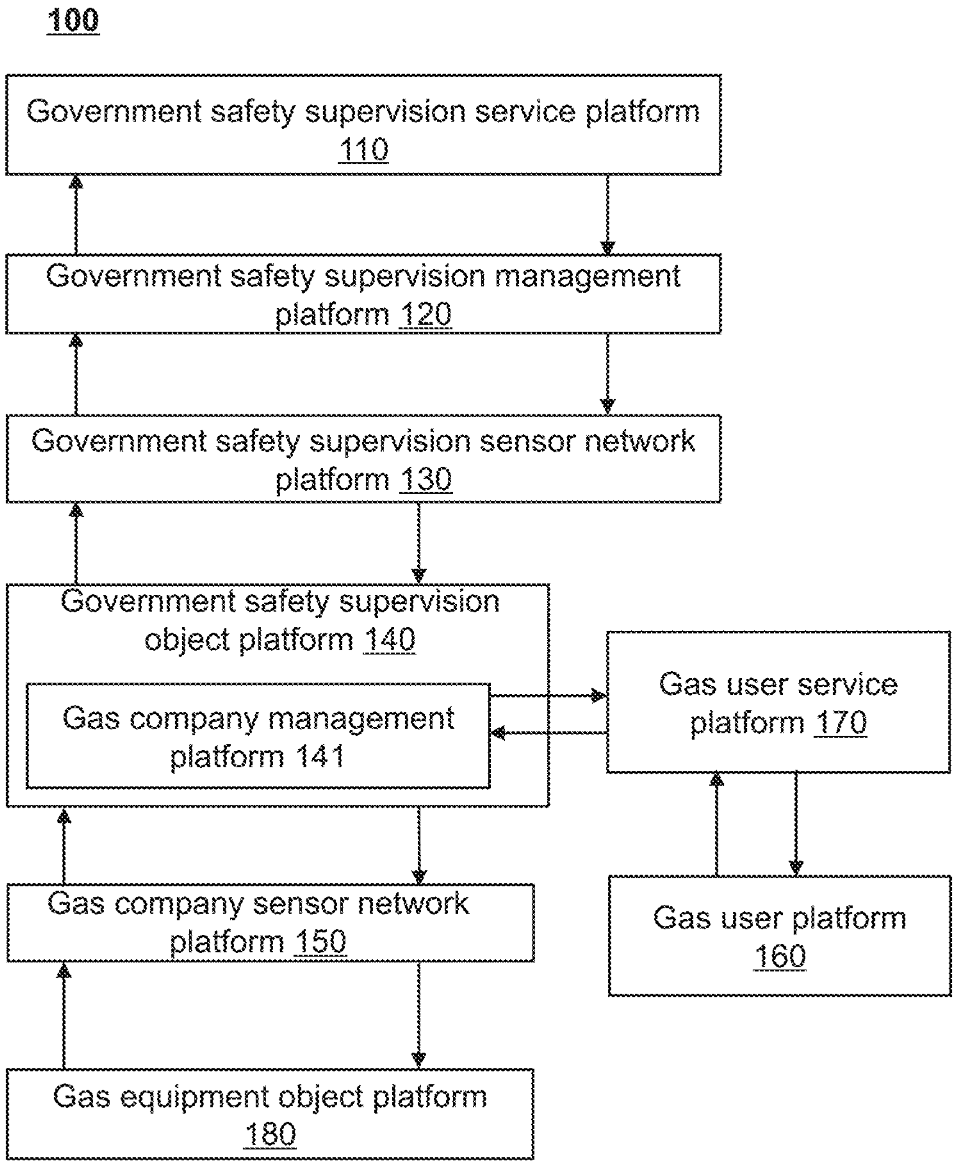
FIG. 1 is a schematic structural diagram of platforms of an Internet of Things (IoT) system for intelligent gas emergency safety management according to some embodiments of the present disclosure.

In order to provide a clearer understanding of the technical solutions of the embodiments described in the present disclosure, a brief introduction to the drawings required in the description of the embodiments is given below. It is evident that the drawings described below are merely some examples or embodiments of the present disclosure, and for those skilled in the art, the present disclosure may be applied to other similar situations without exercising creative labor. Unless otherwise indicated or stated in the context, the same reference numerals in the drawings represent the same structures or operations.

It should be understood that the terms "system," "device," "unit," and/or "module" used herein are ways for distinguishing different levels of components, elements, parts, or assemblies. However, if other terms can achieve the same purpose, they may be used as alternatives.

As indicated in the present disclosure and in the claims, the singular forms "a," "an," and "the" may be intended to include the plural forms as well, unless the context clearly indicates otherwise. In general, the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

Flowcharts are used in the present disclosure to illustrate the operations performed by the system according to the embodiments described herein. It should be understood that the operations may not necessarily be performed in the exact sequence depicted. Instead, the operations may be performed in reverse order or concurrently. Additionally, other operations may be added to these processes, or one or more operations may be removed.

In the prior art, gas management departments typically pre-establish an emergency response plan for a gas emergency event. However, due to the uncertainty of the time and location of gas emergency events, a same gas emergency event may evolve over time. As a result, the pre-established emergency response plan is difficult to adapt to different gas emergency events, thereby increasing the complexity of handling gas emergencies.

Therefore, it is desirable to provide an IoT system and a method for intelligent gas emergency safety management to ensure automation and intelligence of a gas emergency management process, thereby improve the efficiency of emergency responses to gas emergency events, and ensure the safe useage of gas by users.

FIG. 1 is a schematic structural diagram of platforms of an Internet of Things (IoT) system for intelligent gas emergency safety management according to some embodiments of the present disclosure. The IoT system for intelligent gas emergency safety management dislosed by embodiments of the present disclosure will be described in detail below. It should be noted that the following embodiments are used only for explaining the present disclosure and do not constitute a limitation of the present disclosure.

In some embodiments, an Internet of Things (IoT) system 100 for intelligent gas emergency safety management (hereinafter, the IoT system 100) includes a government safety supervision service platform 110, a government safety supervision management platform 120, a government safety supervision sensor network platform 130, a government safety supervision object platform 140, a gas company sensor network platform 150, a gas user platform 160, a gas user service platform 170, and a gas equipment object platform 180.

The government safety supervision service platform 110 is a platform that provides information related to gas operation supervision services.

The government safety supervision management platform 120 refers to an integrated management platform for government management information. In some embodiments, the government safety supervision management platform 120 is configured to process and store data of the IoT system 100.

In some embodiments, the government safety supervision management platform 120 interacts with the government safety supervision sensor network platform 130. For example, the government safety supervision management platform 120 obtains a target emergency response plan from a gas company management platform 141 via the government safety supervision sensor network platform 130.

In some embodiments, the government safety supervision management platform 120 processes information and/or data related to the IoT system 100 to perform one or more functions described in the present disclosure.

More descriptions of the functions performed by the government safety supervision management platform 120 may be found in FIGS. 2-5 and the related descriptions thereof.

The government safety supervision sensor network platform 130 refers to a platform for integrated management of government sensor information.

In some embodiments, the government safety supervision sensor network platform 130 is connected to the government safety supervision management platform 120 and the government safety supervision object platform 140 for data transmission.

In some embodiments, the government safety supervision sensor network platform 130 interacts with the gas company management platform 141.

The government safety supervision object platform 140 is a platform for the government to monitor generation of information and control execution of the information. In some embodiments, the government safety supervision object platform 140 includes the gas company management platform 141.

In some embodiments, the gas company management platform 141 interacts with the government safety supervision sensor network platform 130.

The gas company sensor network platform 150 is configured to manage sensing communications. In some embodiments, the gas company sensor network platform 150 performs functions related to sensing information communication and control information communication. In some embodiments, the gas company sensor network platform 150 may be configured as a communication network, a gateway, or the like.

In some embodiments, the gas company sensor network platform 150 engages in bi-directional communication with the gas equipment object platform 180 to receive emergency event information. In some embodiments, the gas company sensor network platform 150 receives the emergency event information obtained via the gas equipment object platform 180.

The gas user platform 160 refers to a gas user-oriented platform. In some embodiments, the gas user platform 160 interacts with the gas user service platform 170. For example, the gas user platform 160 may query the emergency event information from the gas user service platform, or the like.

The gas user service platform 170 refers to a platform configured to provide information related to the operation of a gas pipeline network.

In some embodiments, the gas user service platform 170 interacts with the gas company management platform 141. For example, the gas user service platform 170 obtains the target emergency response plan from the gas company management platform 141.

In some embodiments, the gas equipment object platform 180 is a functional platform for sensing information generation and controlling information execution. The gas equipment object platform 180 may include a gas monitoring device. The gas monitoring device of the gas equipment object platform 180 transmits monitoring information to the government safety supervision management platform 120 via a communication device. The gas monitoring device is a device for monitoring gas equipment. For example, the gas monitoring device may include a gas concentration detector, a pressure sensor, or the like.

In some embodiments, the gas equipment object platform 180 interacts with the gas company sensor network platform 150.

In some embodiments, the gas equipment object platform 180 is configured to provide the emergency event information.

In some embodiments, the platforms in the IoT system 100 may be classified into a primary network and a secondary network. The primary network refers to a network in which a government user regulates the operation of a gas pipeline network, and the secondary network includes a network in which a gas pipeline network operates. In some embodiments, the same platform in the IoT system 100 assumes different roles in the primary network and the secondary network.

In some embodiments, the primary network includes at least a primary network service platform, a primary network management platform, a primary network sensor network platform, and a primary network object platform. The primary network service platform may include the government safety supervision service platform 110, the primary network management platform may include the government safety supervision management platform 120, the primary network sensing network platform may include the government safety supervision sensor network platform 130, the primary network object platform may include the government safety supervision object platform 140.

In some embodiments, the secondary network may include at least a secondary network user platform, a secondary network service platform, a secondary network management platform, a secondary network sensor network platform, and a secondary network object platform. The secondary network user platform may include the gas user platform 160, the secondary network service platform may include the gas user service platform 170, the secondary network management platform may include the gas company management platform 141, the secondary network sensing network platform may include the gas company sensor network platform 150, and the secondary network object platform may include the gas equipment object platform 180.

More descriptions of the functions of the IoT system 100 may be found in FIGS. 2-5 and the related descriptions thereof.

In some embodiments of the present disclosure, various platforms of the IoT system 100 operate in a coordinated and regulated manner under the unified management of the gas company management platform 141, so that gas emergency events are determined and handled timely and effectively, thereby achieving intelligent and information-based management on gas emergency events.

Figure 2:
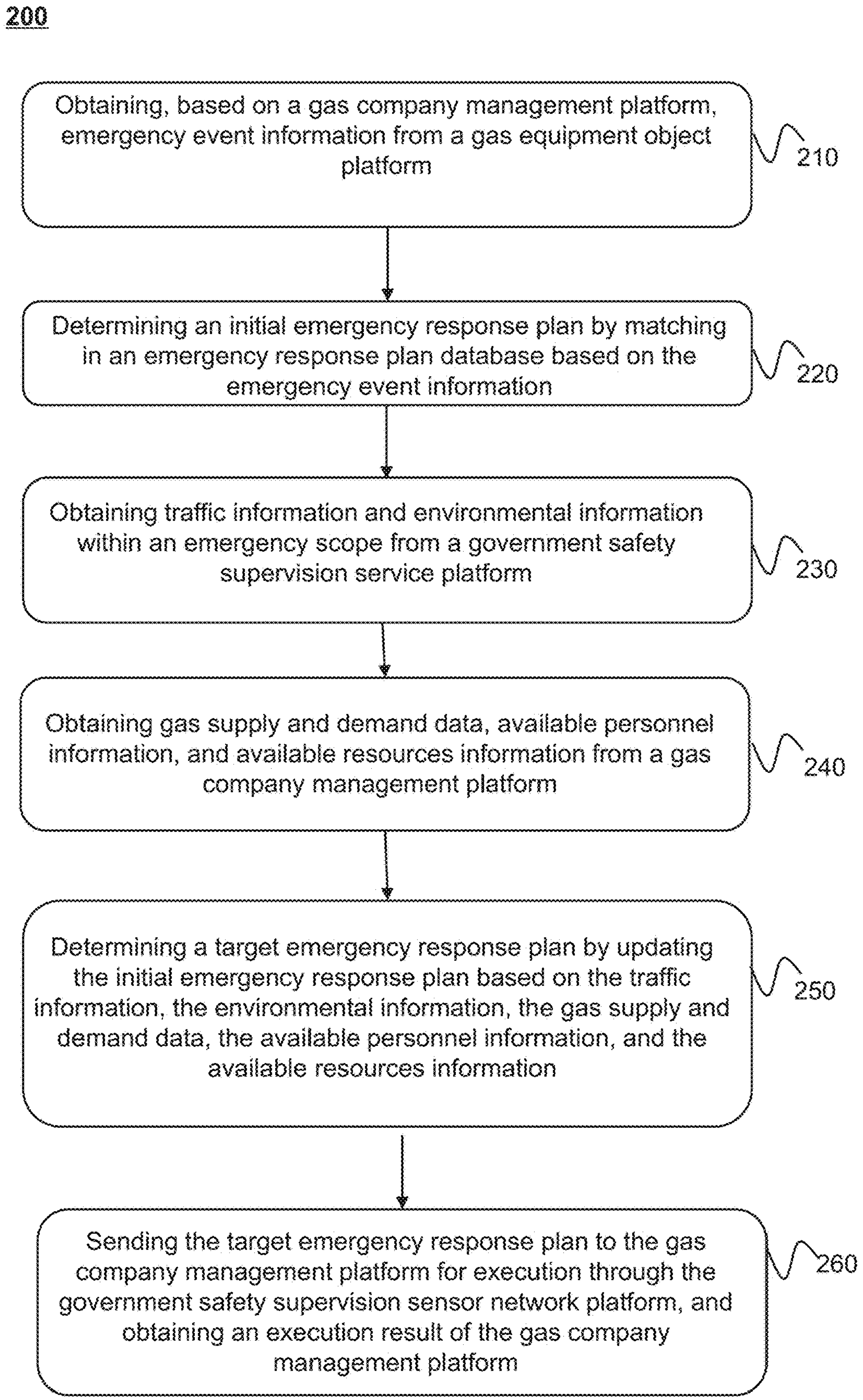
FIG. 2 is a flowchart of an exemplary process of a method for intelligent gas emergency safety management according to some embodiments of the present disclosure.

FIG. 2 is a flowchart of an exemplary process of a method for intelligent gas emergency safety management according to some embodiments of the present disclosure.

As shown in FIG. 2, process 200 includes the following operations. In some embodiments, process 200 may be performed by the government safety supervision management platform 120.

In 210, emergency event information may be obtained from the gas equipment object platform 180 based on the gas company management platform 141.

The emergency event information refers to information related to a gas emergency event that contains information obtained from different channels. The different channels refer to ways in which the information is obtained through different gas monitoring devices. Exemplarily, obtaining data from a gas concentration detector and obtaining data from a pipeline pressure sensor are two channels for obtaining the emergency event information. For example, the emergency event information may include an occurrence time of the gas emergency event, a region in which the gas emergency event occurs, a type of the emergency event, an estimated severity level, an estimated emergency scope, etc.

The estimated severity level is an indicator used to characterize a predicted severity level of the gas emergency event, and the estimated emergency scope is an indicator used to characterize a predicted scope of impact of the gas emergency event. In some embodiments, the estimated severity level and the estimated emergency scope may be predetermined based on experience by a person skilled in the art.

In some embodiments, the emergency event information may be obtained from a gas monitoring device via a communication device based on the gas equipment object platform. Exemplarily, if the gas monitoring device detects a gas leak in a section of a gas pipeline, the gas monitoring device may obtain information such as a time and a location of the gas leak and upload the information via the communication device to the gas equipment object platform.

More descriptions of the gas monitoring device may be found in FIG. 1 and the related descriptions thereof.

In 220, an initial emergency response plan may be determined by matching in an emergency response plan database based on the emergency event information.

The emergency response plan database is a database for storing emergency response plans. In some embodiments, the emergency response plan database includes emergency event characteristics of gas emergency events and emergency response plans corresponding to the emergency event characteristics. The emergency event characteristics are representative features extracted from the gas emergency events. For example, the emergency event characteristics of a gas emergency event may include the occurrence time of the gas emergency event, the region in which the gas emergency event occurs, the type of the gas emergency event, and the estimated severity level of the gas emergency event. In some embodiments, the emergency event characteristics may be obtained in various ways. For example, the emergency event characteristics may be determined by a person skilled in the art based on historical emergency data and a handling effect.

In some embodiments, the emergency response plan database may be constructed based on historical data.

The emergency response plan is an emergency plan for responding to a gas emergency event. In some embodiments, the emergency response plan may include a first dispatch parameter, a second dispatch parameter, and a pressure regulation parameter.

The first dispatch parameter is a parameter for generating an emergency dispatch instruction for dispatch personnel. In some embodiments, the first dispatch parameter includes a count of dispatch personnel.

The dispatch personnel are personnel that may be dispatched to handle gas emergency events. In some embodiments, the dispatch personnel include emergency personnel and maintenance personnel. The emergency personnel are personnel who coordinate the handling of gas emergency events; and the maintenance personnel are personnel who physically handle the gas emergency events.

The second dispatch parameter is a parameter for generating an emergency dispatch instruction for dispatch resources. In some embodiments, the second dispatch parameter includes an amount of dispatch resources.

The dispatch resources refer to resources available for handling gas emergency events. In some embodiments, the dispatch resources may include emergency supplies and maintenance supplies. The emergency supplies refer to general supplies for handling emergencies, such as fire extinguishers and warning signs. The maintenance supplies refer to replacement or updating components or related equipment, such as spare pipes, pipeline reinforcement devices, etc.

The pressure regulation parameter refers to a parameter for regulating the pressure of one or more pipelines in a gas network. In some embodiments, the pressure regulation parameter includes one or more pressure parameters for one or more pipelines in a gas pipeline network, a gas supply suspension/reduction range, a suspension/reduction time period, or the like.

The initial emergency response plan is the emergency response plan that has not been updated. In some embodiments, the initial emergency response plan may be obtained by matching in the emergency response plan database based on the emergency event information. More descriptions of obtaining the initial emergency response plan may be found in operation 220 and the related descriptions thereof.

In some embodiments, the government safety supervision management platform 120 may determine the initial emergency response plan in various ways. For example, the government safety supervision management platform 120 may construct a feature vector based on the emergency envent characteristics, and match the feature vector with reference vectors in a vector database to determine the emergency response plan corresponding to the matched reference vector as the initial emergency response plan. The matching may be performed based on a similarity, wherein the similarity may be determined based on a Euclidean distance, a cosine similarity, or the like.

In some embodiments, the vector database may be constructed based on historical emergency envent characteristics and emergency response plans corresponding to the historical emergency envent characteristics, and the vector database may include at least one reference vector and its corresponding emergency response plan. In some embodiments, the reference vector may be constructed based on a plurality of historical emergency envent characteristics.

In 230, traffic information and environmental information within an emergency scope may be obtained from the government safety supervision service platform 110.

The emergency scope refers to a range of influence of the emergency event. In some embodiments, the emergency scope may be represented in various ways. For example, the emergency scope may include a range of gas supply suspension caused by the emergency event, a maintenance range for the emergency event, a warning range for the emergency event, or the like.

In some embodiments, the emergency scope may be determined based on an estimated emergency scope in the emergency event information. For example, the government safety supervision management platform may designate the estimated emergency scope as a current emergency scope.

The traffic information refers to data related to road traffic conditions. For example, the traffic information may include a road congestion status, a traffic volume at the time of the emergency event, or the like.

The environmental information refers to relevant data characterizing environmental conditions. For example, the environmental information may include temperature, humidity, altitude, or the like.

In some embodiments, the traffic information and the environmental information may queried and obtained from the government safety supervision service platform. More descriptions of the government safety supervision service platform may be found in FIG. 1 and the related descriptions thereof In 240, gas supply and demand data, available personnel information, and available resources information may be obtained from the gas company management platform 141.

The gas supply and demand data refers to data on gas demand and supply in a region associated with the gas emergency event. For example, the gas supply and demand data may include an amount of gas demand, a gas delivery volume, or the like.

The available personnel information refers to information about personnel who are in a standby state and available for handling the gas emergency event. For example, the available personnel information may include locations of technicians and a count of the technicians handling the gas emergency event.

The available resources information refers to information about resources in a standby state that may be used to handle the gas emergency event. For example, the available resources information may include type of resources that may be used to handle the gas emergency event and their corresponding quantities, locations, or the like.

In 250, a target emergency response plan may be determined by updating the initial emergency response plan based on the traffic information, the environmental information, the gas supply and demand data, the available personnel information, and the available resources information.

The target emergency response plan is the emergency response plan used to handle the current emergency.

In some embodiments, the government safety supervision management platform may update the initial emergency response plan in various ways. For example, the government safety supervision service platform may determine required dispatch personnel and dispatch resources by querying a first preset table based on the traffic information, the environmental information, and the gas supply and demand data.

In some embodiments, the first preset table may be constructed based on traffic information, environmental information, and gas supply and demand data corresponding to historical gas emergency events. For example, traffic information, environmental information, and gas supply and demand data corresponding to gas emergency events with relatively good handling results in historical records may be obtained, and emergency response plans for the gas emergency events with relatively good handling results may be recorded in the first preset table. The handling results may be assessed by a person skilled in the art.

In some embodiments, in response to the available personnel information and the available resources information satisfying required dispatch personnel and required dispatch resources, the government safety supervision management platform may determine the first dispatch parameter in the initial emergency response plan as the first dispatch parameter in an updated target emergency response plan, and the second dispatch parameter in the initial emergency response plan as the second dispatch parameter in the updated target emergency response plan. Satisfying the required dispatch personnel and required dispatch resources means that a count of available personnel is greater than a required count of dispatch personnel and a count of available resources is greater than a required count of dispatch resources.

In response to the available personnel information and the available resources information not satisfying the required dispatch personnel and the required dispatch resources, the first dispatch parameter and the second dispatch parameter in the initial emergency response plan may be set as the available personnel information and the available resources information, respectively, to obtain the updated target emergency response plan.

In some embodiments, the pressure regulation parameter may be kept unchanged or set manually as required.

In some embodiments, the government safety supervision management platform 120 may obtain emergency feedback information after an occurrence of a gas emergency event; update the emergency scope corresponding to the gas emergency event based on the emergency event information and the emergency feedback information; obtain traffic information and environmental information within an updated emergency scope; and update the target emergency response plan based on the traffic information and the environmental information within the updated emergency scope.

Figure 3:
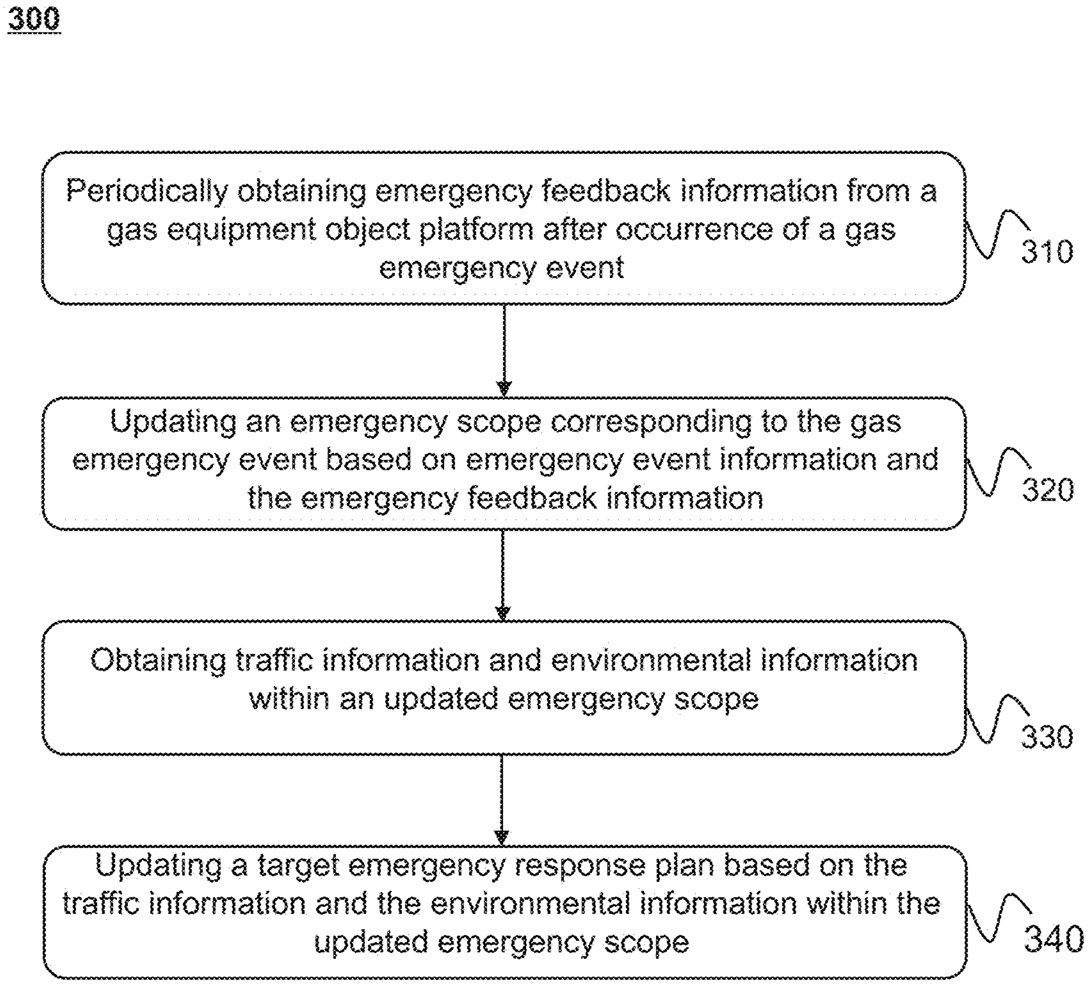
FIG. 3 is a flowchart of an exemplary process for updating a target emergency response plan according to some embodiments of the present disclosure.

More descriptions of updating the target emergency response plan may be found in FIG. 3 and the related descriptions thereof.

In 260, the target emergency response plan may be sent to the gas company management platform 141 for execution through the government safety supervision sensor network platform 110, and an execution result of the gas company management platform 141 may be obtained.

In some embodiments, the government safety supervision management platform may obtain emergency response plan feedback, and determine whether to execute the target emergency response plan based on the target emergency response plan and the emergency response plan feedback.

The emergency response plan feedback refers to an evaluation result of the target emergency response plan. In some embodiments, the emergency response plan feedback may include "pass" or "fail." If the emergency response plan feedback indicates a failure, the government safety supervision management platform may obtain an alternative emergency response plan.

In some embodiments, if the emergency response plan feedback indicates a pass, the government safety supervision management platform 120 sends the target emergency response plan to the gas company management platform 141 for execution. If the emergency response plan feedback indicates a failure, the government safety supervision management platform 120 may designate an alternative emergency response plan included in the emergency response plan feedback as a new target emergency response plan and send the new target emergency response plan to the gas company management platform 141 to be executed.

In some embodiments, executing the target emergency response plan by the government safety supervision management platform may at least include sending the target emergency response plan to a terminal of dispatch personnel involved in the target emergency response plan, instructing the dispatch personnel to transport dispatch resources to a preset location within a preset time period, generating a control instruction based on the pressure regulation parameter, sending the control instruction to a corresponding gas regulation facility, and controlling the regulation facility to regulate a pressure control range and a time period of one or more pipelines in the gas pipeline network.

The preset location is a location where the emergency personnel are responsible for handling the gas emergency event. In some embodiments, the preset location may be pre-determined by a person skilled in the art. The control instruction refers to an instruction for regulating gas regulating facilities. A gas regulation facility is a device for regulating facilities related to the gas pipeline network, such as a pressure regulator, or the like.

The execution result refers to an indicator that characterizes the outcome of handling the gas emergency event after implementing the target emergency response plan. For example, the execution result may include an implementation process of the target emergency response plan, a period of time spent on implementing the target emergency response plan, or the like.

More descriptions of the gas emergency event may be found in FIG. 3 and the related descriptions thereof.

In some embodiments, the execution result may be obtained in various ways. For example, the execution result may be obtained by the government safety supervision management platform after the emergency personnel upload corresponding data via the terminal.

By determining the initial emergency response plan based on the emergency event information, obtaining the traffic information and the environmental information within the emergency scope, determining the target emergency response plan by updating the initial emergency response plan based on the traffic information, the environmental information, the gas supply and demand data, the available personnel information, and the available resources information, and obtaining the execution result, it is possible to accurately acquire an emergency response plan that fits the current gas emergency event situation. This approach helps to better address the current gas emergency event, reduce losses, prevent the gas emergency event from ascalating, reasonably allocate personnel and resources for emergency handling, reduce resource waste, and improve resolution efficiency, thereby ensuring the safety of gas usage for users.

It should be noted that the foregoing description of the process 200 is intended to be exemplary and illustrative only and does not limit the scope of the present disclosure. For a person skilled in the art, various modifications and changes may be made to the process 200 under the guidance of the present disclosure. However, these modifications s and changes remain within the scope of the present disclosure.

FIG. 3 is a flowchart of an exemplary process for updating a target emergency response plan according to some embodiments of the present disclosure. As shown in FIG. 3, process 300 includes the following operations. In some embodiments, process 300 may be performed by a government safety supervision management platform.

In 310, emergency feedback information may be obtained periodically from a gas equipment object platform after an occurrence of a gas emergency event.

A gas emergency event refers to an event in which an abnormal condition occurs in a gas pipeline network. For example, the gas emergency event may include a gas pipeline leak, a gas equipment failure, or the like.

The emergency feedback information refers to information about a condition of a gas pipeline after the execution of the target emergency response plan. For example, the emergency feedback information may include a trend of changes in gas leakage, a result of gas pipeline maintenance, or the like.

In some embodiments, the emergency feedback information may be obtained by periodically querying the gas equipment object platform. The period for query may be pre-set manually.

In 320, the emergency scope corresponding to the gas emergency event may be updated based on emergency event information and the emergency feedback information. More descriptions of the emergency event information may be found in FIG. 2 and the related descriptions thereof.

In some embodiments, the government safety supervision management platform may update the emergency scope corresponding to the gas emergency event by querying a second preset table based on at least one set of emergency event information and emergency feedback information. The second preset table may be constructed based on historical emergency event information, historical emergency feedback information, and historical emergency scopes.

In some embodiments, the government safety supervision management platform may determine, by querying the second preset table, an emergency scope corresponding to a set of data in the second preset table that is closest to current emergency event information and emergency feedback information as the emergency scope corresponding to the gas emergency event.

In some embodiments, the government safety supervision management platform may determine an updated emergency scope through a prediction model based on the emergency event information and the emergency feedback information. More descriptions of the prediction model may be found in FIG. 4 and the related descriptions thereof.

In 330, traffic information and environmental information within the updated emergency scope may be obtained.

In some embodiments, the traffic information and the environmental information within the updated emergency scope may be obtained by querying the government safety supervision sensor network platform. More descriptions of the traffic information and the environmental information may be found in FIG. 2 and the related descriptions thereof.

In 340, the target emergency response plan may be updated based on the traffic information and the environmental information within the updated emergency scope.

In some embodiments, the government safety supervision management platform may update the target emergency response plan based on the traffic information and the environmental information within the emergency scope. The manner of updating the target emergency response plan may refer to the determination of the target emergency response plan in operation 250 of FIG. 2 and the related descriptions thereof.

By updating the emergency scope corresponding to the gas emergency event based on the emergency event information and the emergency feedback information, and updating the target emergency response plan based on the traffic information and the environmental information within the updated emergency scope, a region where the gas emergency event occurs can be dynamically located, so that real-time monitoring of the surrounding environment and traffic conditions can be acheived to adjust the target emergency response plan correspondingly. This effectively improves the efficiency of handling gas emergency events, reduces unnecessary time and resource wastage, and addresses gas emergency events more efficiently, thereby ensuring smooth and safe gas usage.

It should be noted that the foregoing description of process 300 is intended to be exemplary and illustrative only and does not limit the scope of the present disclosure. For a person skilled in the art, various modifications and changes may be made to the process 300 under the guidance of the present disclosure. However, these modifications and changes remain within the scope of the present disclosure.

Figure 4:
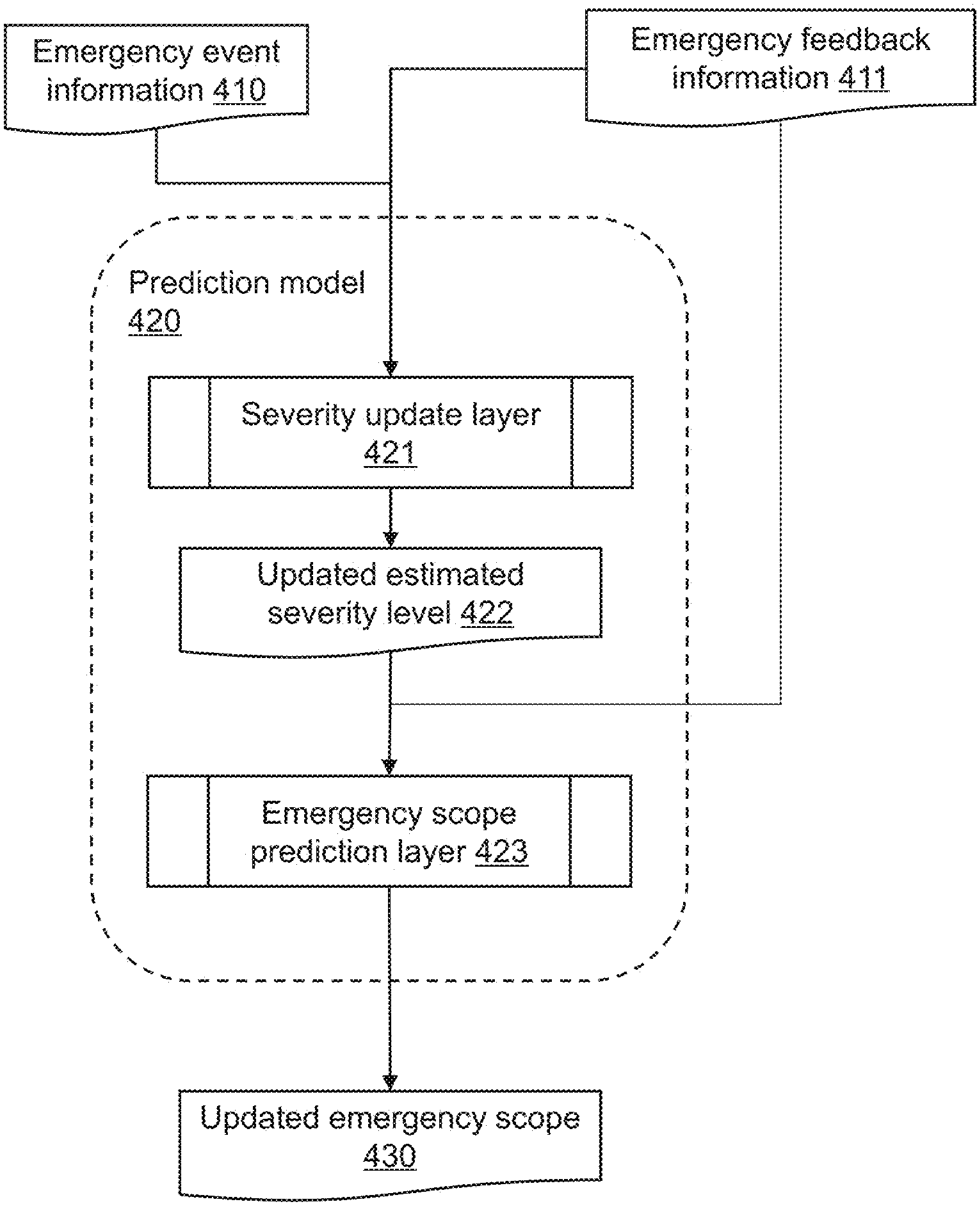
FIG. 4 is a schematic diagram of an exemplary prediction model according to some embodiments of the present disclosure.

FIG. 4 is a schematic diagram of an exemplary prediction model according to some embodiments of the present disclosure.

In some embodiments, a government safety supervision management platform may determine an updated emergency scope 430 based on emergency event information 410 and emergency feedback information 411 through a prediction model 420. In some embodiments, the prediction model 420 may be a machine learning model. More descriptions of the government safety supervision management platform may be found in FIG. 1 and the related descriptions thereof.

In some embodiments, the prediction model may be obtained based on labeled training samples. In some embodiments, the labeled training samples may be input into an initial prediction model, and the initial prediction model may be trained based on the labels. The training samples may include sample emergency event information and sample emergency feedback information, and the training samples may be obtained from a historical database. In some embodiments, the labels may include actual impact ranges corresponding to sample gas emergency events and the sample feedback information.

In some embodiments, the labels may be obtained through manual annotation. In some embodiments, the government safety supervision management platform may determine a largest scope among dispatch resources, gas suspension, or pressure reduction impacts during subsequent handling of a gas emergency event as the actual impact scope corresponding to the gas emergency event. use the largest of the ranges of impact of dispatching resources, gas outages, or pressure reductions in subsequent resolution of the gas emergency events as the actual range of impact.

For example, if the sample emergency event information of training sample 1 includes: a gas emergency event occurs in Region A, and resources from Regions A, B, and C are dispatched, and the sample emergency feedback information of training sample 1 includes: the gas emergency event occurs in Region A is solved, then the actual impact scope corresponding to the gas emergency event, i.e., Region A+Region B+Region C, is determined as the label corresponding to training sample 1.

As another example, if the sample emergency event information of training sample 2 includes: a gas emergency event occurs in Region A, measures of gas suspension are taken in Regions A and C, and measures of pressure reduction are taken in Regions B and D, and the sample emergency feedback information of training sample 2 includes: the gas emergency event occurs in Region A is solved, then the actual impact scope corresponding to the gas emergency event, i.e., Region A+Region B+Region C+Region D, is determined as the label corresponding to training sample 2.

In some embodiments, the prediction model 420 includes a severity update layer 421 and an emergency scope prediction layer 423.

The severity update layer 421 is a model for determining an updated estimated severity level corresponding to the emergency event information. The severity update layer 421 may be a machine learning model, e.g., a Neural Networks (NN) model, or the like.

In some embodiments, an input of the severity update layer 421 includes the emergency event information 410 and the emergency feedback information 411, and an output of the severity update layer 421 includes the updated estimated severity level 422.

The estimated severity level is the severity level of the gas emergency event estimated based on the emergency event information and the emergency feedback information. More descriptions of the emergency event information and the emergency feedback information may be in FIG. 2 and the related descriptions thereof.

The emergency scope prediction layer 423 is a model configured to determine the updated emergency scope. The emergency scope prediction layer 423 may be a machine learning model, e.g., a Neural Networks (NN) model, or the like.

In some embodiments, an input of the emergency scope prediction layer includes the emergency feedback information 411 and the updated estimated severity level 422, and an output of the emergency scope prediction layer includes the updated emergency scope 430.

In some embodiments, the severity update layer 421 and the emergency scope prediction layer 423 are obtained by joint training. In some embodiments, the government safety supervision management platform inputs the sample emergency event information and the sample emergency feedback information into the severity update layer 421 of the prediction model 420, inputs the updated estimated severity level 422 output from the severity update layer 421 into the emergency scope prediction layer 423 of the prediction model 420, and constructs a loss function based on the output of the emergency scope prediction layer 423 and the labels. Parameters of the severity update layer 421 and the emergency scope prediction layer 423 are iteratively updated simultaneously based on the loss function until a preset condition for training completion is met. After training, the parameters of the severity update layer 421 of the prediction model 420 may also be determined.

Obtaining the parameters of the severity update layer 421 through the above training manner can help address the issue of obtaining labels when training the severity update layer 421 separately, and also enable the severity update layer 421 to better obtain the updated estimated severity 422. More descriptions of the training samples and the labels may be found in the previous related descriptions.

In some embodiments of the present disclosure, through joint processing by the severity update layer and the emergency scope prediction layer, the updated emergency scope can be effectively predicted based on the emergency event information and the emergency feedback information, which makes the updated emergency scope more accurate.

In some embodiments, the prediction model is obtained after a first stage of training.

In some embodiments, the first stage of training includes: sequentially training the initial prediction model based on a first training dataset, validating the initial prediction model based on a first validation dataset, and testing the initial prediction model based on a first test dataset to obtain the prediction model. The first training dataset is used to train internal parameters of the prediction model, the first validation dataset is used to check a status and convergence of the prediction model during training, and the first test set is used to evaluate a training effect of the prediction model.

In some embodiments, the first training dataset, the first test dataset, and the first validation dataset are derived from an event dataset corresponding to historical gas emergency events. The event dataset includes the emergency event information and the emergency feedback information.

In some embodiments, data in the first training dataset, the first test dataset, and the first validation dataset are in a first predetermined ratio. In some embodiments, the data in the first training dataset, the first test dataset, and the first validation dataset are in a ratio of 8:1:1.

In some embodiments, there is no data overlap between the first training dataset, the first test dataset, and the first validation dataset, i.e., a piece of data only exists in one of the first training dataset, the first test dataset, or the first validation dataset.

In some embodiments, a statistical difference of samples of the first training dataset is greater than a predetermined difference threshold.

The statistical difference of samples refers to the diversity of the samples of the first training dataset. In some embodiments, the greater the sample diversity is, the greater the statistical difference of samples is.

In some embodiments, the government safety supervision management platform quantifies the emergency event information and the emergency feedback information of each sample in the first training dataset as a number, i.e., each sample corresponds to a numeric vector. For example, the emergency feedback information includes a gas leakage trend, if the gas leakage trend decreases, the corresponding emergency feedback information is quantified as 1, if the gas leakage trend increases, the corresponding emergency feedback information is quantified as 0.

In some embodiments, the government safety supervision management platform determines a vector distance (e.g., a cosine distance) between two samples in the first training dataset, and then determines a variance of a plurality of vector distances. The larger the variance is, the greater the statistical difference of samples. In some embodiments, introducing the statistical difference of samples can make the prediction model more robust and prevent the prediction model from overfitting.

In some embodiments, the predetermined difference threshold is related to a statistical value of severity levels of historical gas emergency events. In some embodiments, the statistical value may be a variance. The greater the statistical value of the severity levels of the historical emergency events is, the larger the predetermined difference threshold is. A higher statistical value of severity levels of historical gas emergency events indicates greater uncertainty and more potential impacts. Therefore, the predetermined difference threshold may be adjusted upwards to allow the prediction model to learn from more broadly distributed data samples, thereby improving the accuracy of prediction of the updated emergency scope.

In some embodiments of the present disclosure, the government safety supervision management platform obtains data from a historical database to construct the first training set, the first validation set, and the first test set, and train and validate the initial prediction model, which effectively improve the accuracy of the prediction model, thereby increasing the accuracy of the updated emergency scope.

In some embodiments of the present disclosure, based on emergency event information and the emergency feedback information, the updated emergency scope can be determined through the prediction model, which can comprehensively take into account the status information of gas pipelines, timely and accurately obtain the updated emergency scope, and ensure that the updated emergency scope is as accurate as possible, thereby effectively reducing the impact of gas events.

In some embodiments, the government safety supervision management platform obtains historical emergency data through a gas company management platform 141.

The historical emergency data refers to emergency event characteristics extracted from historical gas emergency events and emergency response plans for resolving the historical gas emergency events. More descriptions of the emergency event characteristics may be found in FIG. 2 and the related descriptions thereof.

In some embodiments, the government safety supervision management platform updates an emergency response plan database based on the historical emergency data. More descriptions of the emergency response plan database may be found in FIG. 2 and the related descriptions thereof.

In some embodiments, the government safety supervision management platform identifies a most frequently used emergency response plan for each emergency event characteristic in the historical emergency data and includes the most frequently used emergency response plan to the emergency response plan database.

Figure 5:
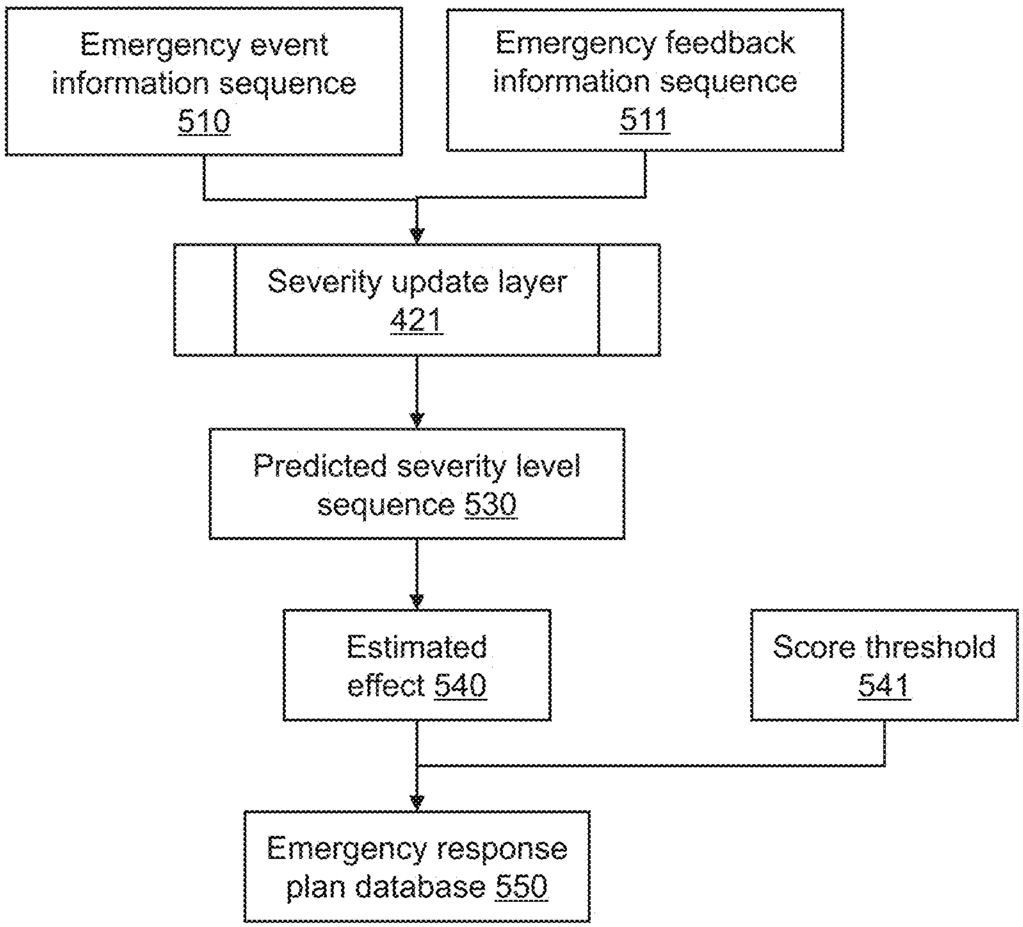
FIG. 5 is an exemplary schematic diagram of updating an emergency response plan database according to some embodiments of the present disclosure.

FIG. 5 is an exemplary schematic diagram of updating an emergency response plan database according to some embodiments of the present disclosure.

In some embodiments, a government safety supervision management platform predicts an estimated effect 540 of an emergency response plan in historical emergency data based on emergency event information sequence 510 and emergency feedback information sequence 511 during the execution of the emergency response plan. More descriptions of the government safety supervision management platform may be found in FIG. 1 and the related descriptions thereof.

More descriptions of the historical emergency data may be found in FIG. 4 and the related descriptions thereof.

The emergency event information sequence refers to a sequence consisting of emergency event information. For example, in an emergency event information sequence M ($m_1$, $m_2$, $m_3$, $m_4$, $m_5$), $m_1$, $m_2$, $m_3$, $m_4$, and $m_5$ represent an occurrence time, a region, a type, an estimated severity level, and an estimated emergency scope of a gas emergency event, respectively. More descriptions of the emergency event information may be found in FIG. 2 and the related descriptions thereof.

The emergency feedback information sequence refers to a sequence of emergency feedback information. For example, in an emergency feedback sequence N ($n_1$, $n_2$), $n_1$ represents a gas leakage trend, and $n_2$ represents an inspection result. More descriptions of the emergency feedback information may be found in FIG. 2 and the related descriptions thereof.

The estimated effect refers to an estimated processing outcome of the gas emergency event after executing the emergency response plan. In some embodiments, the estimated effect is used to evaluate the quality of handling the gas emergency event after executing the emergency response plan.

In some embodiments, the government safety supervision management platform predicts the estimated effect of the emergency response plan by clustering based on the emergency event information sequence and the emergency feedback information sequence during the execution of the emergency response plan.

In some embodiments, for each historical gas emergency event in a historical database, the government safety supervision management platform designates at least one emergency response plan corresponding to the historical gas emergency event and emergency event information sequences and emergency feedback information sequences during the execution of the least one emergency response plan as clustering vectors. A preset count of cluster centers may be formed. Emergency response plans with distances from the cluster centers greater than a preset distance threshold and losses incurred during actual handling that exceed a preset loss threshold are discarded.

The loss incurred during actual handling refers to gas-related losses incurred during the execution of the emergency response plan. For example, if gas suspension is required during the execution of an emergency response plan, some institutions that cannot afford to have their gas supply suspended may need a temporary gas supply, and the cost of the temporary gas supply is considered the loss incurred during the actual handling.

In some embodiments, the government safety supervision management platform determines the estimated effect of an emergency response plan through a weighted calculation based on a distance between the emergency response plan and a closest clustering center and the loss incurred during the actual handling of the emergency response plan.

For example, the estimated effect=$a_1$×distance between the emergency response plan and the closest clustering center+$a_2$×loss incurred during the actual handling of the emergency response plan.

In some embodiments, weights $a_1$ and $a_2$ are preset manually. In some embodiments, the weights $a_1$ and $a_2$ are adjusted based on a concentration level of locations of different historical gas emergency events.

In some embodiments, the government safety supervision management platform quantifies the locations of different historical gas emergency events, and determins a variance thereof. The smaller the variance is, the more concentrated the locations of the historical gas emergency events are; the larger the variance is, the more dispersed the locations of the historical gas emergency events are.

In some embodiments, if the locations of the historical gas emergency events are more concentrated, the weight $a_2$ may be increased by n preset values (e.g., increasing by 2 percentage points). If the locations of the historical gas emergency events are more dispersed, the weight $a_1$ may be increased by n preset values (e.g., increasing by 2 percentage points).

In some embodiments, the government safety supervision management platform obtains a predicted severity level sequence 530 during the execution of the emergency response plan by the severity update layer 421 based on the emergency event information sequence 510 and the emergency feedback information sequence 511.

The predicted severity level sequence is a sequence consisting of estimated severity levels obtained from the gas emergency event information and the emergency feedback information. More descriptions of the estimated severity level and the severity update layer may be found in FIG. 4 and the related descriptions thereof.

In some embodiments, the government safety supervision management platform predicts the estimated effect 540 based on the predicted severity level sequence 530. For example, the government safety supervision management platform determines a severity fluctuation characteristic and an average value of severity levels based on the predicted severity level sequence, and obtains the estimated effect 540 through weighting based on the severity level fluctuation characteristic and the average value of severity levels. The severity fluctuation characteristic is calculated as a standard deviation of severity levels divided by the average value of severity levels. The estimated effect=$k_1$×severity level fluctuation threshold/severity level fluctuation characteristic+$k_2$×severity level average threshold/severity level average value. Weights $k_1$ and $k_2$ may be pre-set manually based on experience.

In some embodiments of the present disclosure, predicting the estimated effect of an emergency response plan based on the predicted severity level sequence allows for a clearer understanding of the severity level of the gas emergency event and a more accurate prediction of the effectiveness of an emergency response plan for the gas emergency event, which enhances the accuracy of the estimated effect of the emergency response plan and facilitates a more correct and objective assessment of the effectiveness of the emergency response plan.

In some embodiments, the government safety supervision management platform updates the emergency response plan database 550 based on the estimated effect 540 and a score threshold 541 for the emergency response plan.

In some embodiments, the government safety supervision management platform includes an emergency response plan whose estimated effect is greater than the score threshold to the emergency response plan database 550 based on the estimated effect 540 of the emergency response plan and the score threshold 541. In some embodiments, the score threshold is preset manually.

In some embodiments, the score threshold is related to frequencies of gas emergency events in different regions. In some embodiments, if gas emergency events occur frequently in a region, it may be necessary to prepare more initial emergency response plans to handle frequent gas emergency events at different locations with different severity levels and different emergency scopes within the region. Thus, the higher the frequency of gas emergency events is, the lower the score threshold is. For example, the score threshold may be calculated as: the score threshold=$w_1$×gas emergency event frequency threshold/frequency of gas emergency events, wherein $w_1$ is a normalization factor preset manually. In some embodiments, if the frequency of gas emergency events in a region is high, the score threshold is appropriately lowered. The frequency threshold refers to a pre-set rate of gas emergency events occurring within a region.

In some embodiments, the frequencies of gas emergency events in different regions are obtained from a gas company management platform 141. More descriptions of the gas company management platform 141 may be found in FIG. 1 and the related descriptions thereof.

In some embodiments of the present disclosure, determining the score threshold based on the frequency of gas emergency events in different regions allows for flexible adjustment of the score threshold according to the frequency of gas emergency events, which facilitates more accurate selection of an emergency response plan whose estimated effect satisfy requirements.

In some embodiments of the present disclosure, updating the emergency response plan database based on the estimated effect and the score threshold of the emergency response plan enables real-time updates of the emergency response plan database, thereby effectively improving the accuracy of the emergency response plan database.

In some embodiments of the present disclosure, updating the emergency response plan database based on the historical emergency data can fully utilize effective information from the historical data, enhancing the accuracy of the emergency response plan database and laying a foundation for developing emergency response plans for future gas emergency events.

Having thus described the basic concepts, it may be rather apparent to those skilled in the art after reading this detailed disclosure that the foregoing detailed disclosure is intended to be presented as illustrative example and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of the present disclosure.

Moreover, certain terminology has been configured to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

As another example, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This way of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties configured to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameter set forth in the written description and attached claims are approximations that may vary depending upon the desired properties sought to be obtained by a particular embodiment. In some embodiments, the numerical parameter should be construed in light of the number of reported significant digits and by applying ordinary rounding techniques. Notwithstanding that the numerical ranges and parameter setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrating of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. An Internet of Things (IoT) system for intelligent gas emergency safety management, comprising a government safety supervision service platform, a government safety supervision management platform, a government safety supervision sensor network platform, a government safety supervision object platform, and a gas equipment object platform; wherein the government safety supervision object platform includes a gas company management platform;

the government safety supervision management platform is configured to:

obtain, based on the gas company management platform, emergency event information from the gas equipment object platform;

determine an initial emergency response plan by matching in an emergency response plan database based on the emergency event information;

obtain traffic information and environmental information within an emergency scope from the government safety supervision service platform;

obtain gas supply and demand data, available personnel information, and available resources information from the gas company management platform;

determine a target emergency response plan by updating the initial emergency response plan based on the traffic information, the environmental information, the gas supply and demand data, the available personnel information, and the available resources information; and send the target emergency response plan to the gas company management platform for execution through the government safety supervision sensor network platform, and obtain an execution result of the gas company management platform;

the government safety supervision management platform is further configured to:

periodically obtain emergency feedback information from the gas equipment object platform after an occurrence of a gas emergency event;

update the emergency scope corresponding to the gas emergency event based on the emergency event information and the emergency feedback information;

obtain traffic information and environmental information within an updated emergency scope; and update the target emergency response plan based on the traffic information and the environmental information within the updated emergency scope;

the government safety supervision management platform is further configured to:

determine the updated emergency scope through a prediction model based on the emergency event information and the emergency feedback information, wherein the prediction model is a machine learning model;

the prediction model includes a severity update layer and an emergency scope prediction layer; an input of the severity update layer includes the emergency event information and the emergency feedback information, and an output of the severity update layer includes an updated estimated severity level; an input of the emergency scope prediction layer includes the emergency feedback information and the updated estimated severity level, and an output of the emergency scope prediction layer includes the updated emergency scope;

the prediction model is obtained through a first stage of training; the first stage of training includes: training an initial prediction model based on a first training dataset, validating the initial prediction model based on a first validation dataset, and testing the initial prediction model based on a first test dataset to obtain the prediction model; wherein the first training dataset, the first test dataset, and the first validation dataset are derived from an event dataset corresponding to historical gas emergency events, the event dataset includes the emergency event information and the emergency feedback information; a data volume of the first training dataset, a data volume of the first test dataset, and a data volume of the first validation dataset are in a first predetermined ratio; there is no data overlap between the first training dataset, the first test dataset, and the first validation dataset, and a statistical difference of samples of the first training dataset is greater than a predetermined difference threshold, the predetermined difference threshold being related to a statistical value of severity levels of the historical gas emergency events.

2. The system of claim 1, wherein the government safety supervision management platform is further configured to:

obtain historical emergency data through the gas company management platform; and update the emergency response plan database based on the historical emergency data.

3. The system of claim 2, wherein the government safety supervision management platform is further configured to:

predict an estimated effect of an emergency response plan in the historical emergency data based on an emergency event information sequence and an emergency feedback information sequence during the execution of the emergency response plan; and update the emergency response plan database based on the estimated effect and a score threshold for the emergency response plan.

4. The system of claim 3, wherein the government safety supervision management platform is further configured to:

obtain a predicted severity level sequence during the execution of the emergency response plan by the severity update layer based on the emergency event information sequence and the emergency feedback information sequence; and predict the estimated effect based on the predicted severity level sequence.

5. The system of claim 3, wherein the score threshold is related to occurrence frequencies of gas emergency events in different regions.

6. A method for intelligent gas emergency safety management, the method being realized by an IoT system for intelligent gas emergency safety management, the IoT system comprising a government safety supervision service platform, a government safety supervision management platform, a government safety supervision sensor network platform, a government safety supervision object platform, and a gas equipment object platform, the government safety supervision object platform including a gas company management platform; the method being implemented by the government safety supervision management platform, and the method comprising:

obtaining, based on the gas company management platform, emergency event information from the gas equipment object platform;

determining an initial emergency response plan by matching in an emergency response plan database based on the emergency event information;

obtaining traffic information and environmental information within an emergency scope from the government safety supervision service platform;

obtaining gas supply and demand data, available personnel information, and available resources information from the gas company management platform;

determining a target emergency response plan by updating the initial emergency response plan based on the traffic information, the environmental information, the gas supply and demand data, the available personnel information, and the available resources information; and sending the target emergency response plan to the gas company management platform for execution through the government safety supervision sensor network platform, and obtaining an execution result of the gas company management platform; wherein the determining a target emergency response plan by updating the initial emergency response plan based on the traffic information, the environmental information, the gas supply and demand data, the available personnel information, and the available resources information includes:

periodically obtaining emergency feedback information from the gas equipment object platform after an occurrence of a gas emergency event;

updating the emergency scope corresponding to the gas emergency event based on the emergency event information and the emergency feedback information;

obtaining traffic information and environmental information within an updated emergency scope; and updating the target emergency response plan based on the traffic information and the environmental information within the updated emergency scope;

the updating the emergency scope corresponding to the gas emergency event based on the emergency event information and the emergency feedback information includes:

determining the updated emergency scope through a prediction model based on the emergency event information and the emergency feedback information, wherein the prediction model is a machine learning model;

the prediction model includes a severity update layer and an emergency scope prediction layer; an input of the severity update layer includes the emergency event information and the emergency feedback information, and an output of the severity update layer includes an updated estimated severity level; an input of the emergency scope prediction layer includes the emergency feedback information and the updated estimated severity level, and an output of the emergency scope prediction layer includes the updated emergency scope;

the prediction model is obtained through a first stage of training; the first stage of training includes: training an initial prediction model based on a first training dataset, validating the initial prediction model based on a first validation dataset, and testing the initial prediction model based on a first test dataset to obtain the prediction model; wherein the first training dataset, the first test dataset, and the first validation dataset are derived from an event dataset corresponding to historical gas emergency events, the event dataset includes the emergency event information and the emergency feedback information; a data volume of the first training dataset, a data volume of the first test dataset, and a data volume of the first validation dataset are in a first predetermined ratio; there is no data overlap between the first training dataset, the first test dataset, and the first validation dataset, and a statistical difference of samples of the first training dataset is greater than a predetermined difference threshold, the predetermined difference threshold being related to a statistical value of severity levels of the historical gas emergency events.

7. A non-transitory computer-readable storage medium, wherein the storage medium stores computer instructions, and when a computer reads the computer instructions, the computer executes the method for intelligent gas emergency safety management of claim 6.

* * * * *